(12) United States Patent
Hagen et al.

(10) Patent No.: US 11,922,794 B2
(45) Date of Patent: Mar. 5, 2024

(54) SYSTEM FOR DETECTING ACCIDENTAL DAMAGE AND COMMUNICATION

(71) Applicant: AUDI AG, Ingolstadt (DE)

(72) Inventors: Harald Hagen, Creussen (DE); Willi Wendt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/909,015

(22) PCT Filed: Jan. 25, 2021

(86) PCT No.: PCT/EP2021/051554
§ 371 (c)(1),
(2) Date: Sep. 2, 2022

(87) PCT Pub. No.: WO2021/175510
PCT Pub. Date: Sep. 10, 2021

(65) Prior Publication Data
US 2023/0093041 A1  Mar. 23, 2023

(30) Foreign Application Priority Data
Mar. 5, 2020 (DE) ..................... 10 2020 105 949.3

(51) Int. Cl.
*H04W 4/40* (2018.01)
*G08B 25/10* (2006.01)
*G07C 5/00* (2006.01)
*H04W 80/12* (2009.01)
*H04W 84/12* (2009.01)

(52) U.S. Cl.
CPC .............. *G08B 25/10* (2013.01); *H04W 4/40* (2018.02); *G07C 5/008* (2013.01); *H04W 80/12* (2013.01); *H04W 84/12* (2013.01)

(58) Field of Classification Search
CPC ........ G08B 25/10; H04W 4/40; H04W 80/12; H04W 84/12; G07C 5/008
USPC ........................................................ 340/436
See application file for complete search history.

(56) References Cited

U.S. PATENT DOCUMENTS

| | | | |
|---|---|---|---|
| 8,799,034 B1* | 8/2014 | Brandmaier | G07C 5/008 705/4 |
| 9,292,982 B1* | 3/2016 | Higgs | G06Q 10/06 |
| 10,032,226 B1* | 7/2018 | Suizzo | G07C 5/008 |
| 10,354,230 B1* | 7/2019 | Hanson | G07B 15/00 |
| 10,417,713 B1* | 9/2019 | Brandmaier | G06Q 40/08 |
| 10,493,938 B1* | 12/2019 | Nelson | B60R 21/0136 |

(Continued)

FOREIGN PATENT DOCUMENTS

| | | |
|---|---|---|
| CN | 108965439 A | 12/2018 |
| CN | 10 2017 219 818 A1 | 5/2019 |

(Continued)

OTHER PUBLICATIONS

International Search Report dated Mar. 29, 2021 for International Application No. PCT/EP2021/051554.

(Continued)

*Primary Examiner* — Kerri L McNally
*Assistant Examiner* — Thang D Tran
(74) *Attorney, Agent, or Firm* — STAAS & HALSEY LLP

(57) ABSTRACT

When a parked vehicle sustains accidental damage, the system automatically communicates with the vehicle owner and optionally the perpetrator of the damage via, e.g., WLAN communications.

11 Claims, 1 Drawing Sheet

(56) References Cited

U.S. PATENT DOCUMENTS

| | | | | |
|---|---|---|---|---|
| 11,157,973 | B2* | 10/2021 | Fuchs | G06Q 30/0283 |
| 2004/0068555 | A1* | 4/2004 | Satou | G08G 1/0962 |
| | | | | 709/219 |
| 2008/0294690 | A1* | 11/2008 | McClellan | G07C 5/0808 |
| 2013/0030642 | A1* | 1/2013 | Bradley | G07C 5/008 |
| | | | | 701/32.2 |
| 2013/0109416 | A1* | 5/2013 | Tang | H04W 4/14 |
| | | | | 455/466 |
| 2014/0132404 | A1* | 5/2014 | Katoh | B60R 21/013 |
| | | | | 340/436 |
| 2015/0222553 | A1* | 8/2015 | Macdonald | H04W 4/40 |
| | | | | 370/230.1 |
| 2015/0256506 | A1* | 9/2015 | Sawato | H04L 12/1895 |
| | | | | 715/758 |
| 2015/0329121 | A1* | 11/2015 | Lim | H04M 1/72412 |
| | | | | 701/36 |
| 2016/0358315 | A1* | 12/2016 | Zhou | G06T 3/4092 |
| 2017/0178512 | A1* | 6/2017 | Kannon | B60Q 9/008 |
| 2017/0180529 | A1* | 6/2017 | Farrell | H04M 1/6091 |
| 2018/0154908 | A1* | 6/2018 | Chen | B60W 50/0097 |
| 2018/0307967 | A1* | 10/2018 | Graf | G01S 7/417 |
| 2018/0322413 | A1* | 11/2018 | Yocam | G06N 20/00 |
| 2019/0012908 | A1* | 1/2019 | Chun | G08G 1/04 |
| 2019/0156594 | A1* | 5/2019 | Snyder | H04W 4/44 |
| 2019/0189007 | A1* | 6/2019 | Herman | G08G 1/0133 |
| 2019/0359127 | A1* | 11/2019 | Alfano | B60Q 5/00 |
| 2020/0084314 | A1* | 3/2020 | Mahar | H04W 4/40 |
| 2020/0260231 | A1* | 8/2020 | Ganesan | H04L 5/0055 |
| 2020/0311716 | A1* | 10/2020 | Ravi | G06Q 20/325 |
| 2020/0344583 | A1* | 10/2020 | Lee | H04W 4/48 |
| 2020/0413242 | A1* | 12/2020 | Yokoyama | B60R 25/24 |
| 2022/0053449 | A1* | 2/2022 | Shan | H04W 4/40 |
| 2022/0103333 | A1* | 3/2022 | Ghozlan | H04W 8/00 |
| 2022/0103973 | A1* | 3/2022 | Sirotkin | H04W 4/02 |
| 2022/0116129 | A1* | 4/2022 | Ying | H04B 17/345 |
| 2022/0116821 | A1* | 4/2022 | Wei | H04L 27/2636 |
| 2022/0201079 | A1* | 6/2022 | Jurthe | H04W 12/088 |

FOREIGN PATENT DOCUMENTS

| | | | |
|---|---|---|---|
| DE | 10 2010 001 006 A1 | | 7/2011 |
| DE | 102010001006 | * | 7/2011 |
| DE | 10 2013 214 569 A1 | | 1/2015 |
| DE | 20 2015 003 921 U1 | | 9/2015 |
| DE | 10 2017 009 593 A1 | | 7/2018 |
| DE | 102017009593 | * | 7/2018 |
| JP | 2004-86780 | | 3/2004 |
| KR | 10-2004-0085574 | | 10/2004 |

OTHER PUBLICATIONS

Office Action dated Dec. 18, 2020 for German Application No. 10 2020 105 949.3.
Office Action dated Jun. 14, 2022 for German Application No. 10 2020 105 949.3.
Translation of the International Preliminary Report on Patentability dated Feb. 14, 2022 for International Application No. PCT/EP2021/051554.
PCT/EP2021/051554, Jan. 25, 2021, Harald Hagen, Audi AG.
10 2020 105 949.3, Mar. 5, 2020, Harald Hagen, Audi AG.
Office Action dated Dec. 28, 2022 for Chinese Application No. 202180007848.5, with English language summary of Examiner's comments.

* cited by examiner

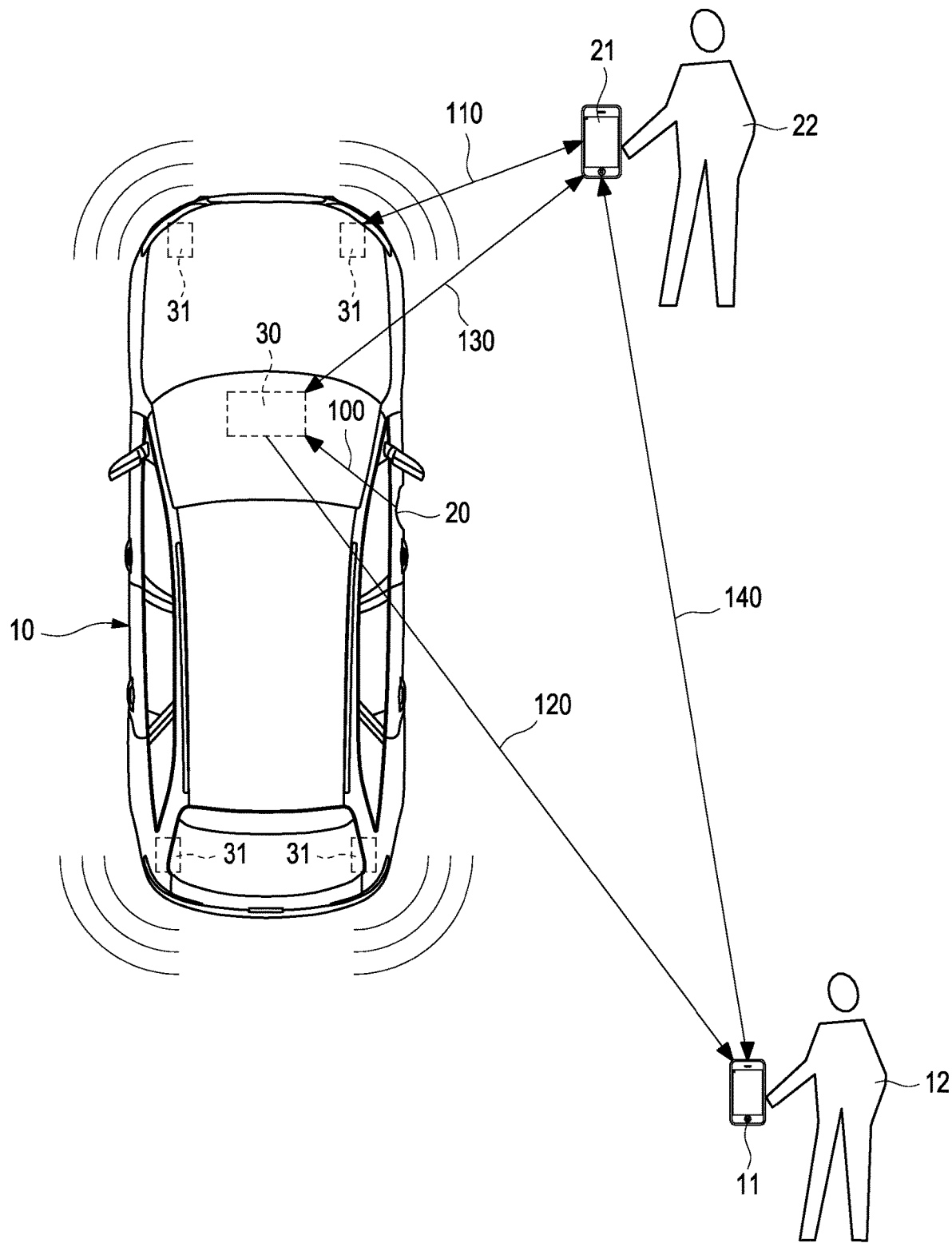

SYSTEM FOR DETECTING ACCIDENTAL DAMAGE AND COMMUNICATION

CROSS REFERENCE TO RELATED APPLICATIONS

This application is a U.S. national stage of International Application No. PCT/EP2021/051554, filed on Jan. 25, 2021. The International Application claims the priority benefit of German Application No. 10 2020 105 949.3 filed on Mar. 5, 2020. Both the International Application and the German Application are incorporated by reference herein in their entirety.

BACKGROUND

Described below are a system for detecting accidental damage to a parked vehicle and for communication with the vehicle owner and optionally the perpetrator of the damage, and a method for operating the system.

In order to monitor a parked vehicle for parking collisions during the absence of the vehicle driver and optionally to inform the vehicle owner or fleet manager about damage, use is made of systems which detect parking collisions and notify the vehicle owner or fleet manager or an authorized addressee.

Vehicle vibrations and structure-borne sound events on bodywork parts are detected by way of a central sensor or individual sensors secured to vehicle exterior parts. These structure-borne sound signals are evaluated and classified as a damage event (scratch/impact/dent/compression) depending on severity. The absent vehicle driver or vehicle owner is subsequently informed by way of telematics. With a time lag, the environment camera of the vehicle is likewise activated and the environment of the vehicle can be viewed by the authorized user by way of remote access and/or the environment camera automatically takes a photograph or creates a video recording.

According to this method, information about the damage event is communicated only to the vehicle driver or vehicle owner. Identifying the perpetrator of the damage requires complex evaluation of images and recordings, and no possibility for direct communication with the perpetrator of the damage is provided.

US 2019/156594 A1 discloses systems and methods for detecting an accident of a motor vehicle. The acceleration of the vehicle is measured using an accelerometer of a mobile device, the accelerometer being situated within the vehicle. The system determines the magnitude of each acceleration measurement and checks whether the magnitude exceeds one or more threshold values. The system also determines the number of acceleration events within a time window and whether the number exceeds one or more threshold values. On the basis of the magnitudes of acceleration, number of acceleration events and various threshold values, the system determines whether an accident involving the vehicle has occurred.

KR 2004/0085574 A discloses a vehicle accident recording device comprising a mobile communication unit, by which device IDs of cellular phones or PDAs of the driver of a vehicle involved in the accident and of passers-by who observe the accident are received during the accident by way of Bluetooth communication, and are automatically recorded and transmitted to a server via a mobile radio network in order to identify witnesses of the accident.

CN 108965439 A relates to an emergency system for vehicle accidents which is based on a Wi-Fi communication module. The emergency system comprises an accident emergency module and a plurality of vehicle monitoring modules. Each monitoring module comprises a central processing unit, an interface enabling access to an electronic device, an acquisition unit for collecting vehicle information at the accident site, a face recognition unit for collecting information about the driver at the accident site, an input unit, which sends an interaction request to the central processing unit, a position determining unit for determining the position of the accident site, a Wi-Fi communication unit for establishing a connection between the vehicle monitoring module and the accident emergency module, and a power supply unit, the central processing unit being connected to the interface, the acquisition unit for collecting vehicle information, the face recognition unit, the input unit, the position determining unit and the Wi-Fi communication unit.

SUMMARY

Against this background, the problem is providing methods and devices which enable an automatic identification of the perpetrator of damage and a direct communication between the vehicle and/or the owner thereof and the perpetrator of the damage. Described herein is a method in which upon detection of damage to a parked motor vehicle, at least one communication module of the motor vehicle acquires the MAC addresses of the mobile communication devices situated in the environment of the motor vehicle and communicates them to a mobile communication device of the vehicle owner. The mobile communication devices in the environment of the motor vehicle have to be capable of communicating with the at least one communication module of the motor vehicle. In one embodiment, the at least one communication module of the motor vehicle is a WLAN module. In another embodiment, the at least one communication module of the motor vehicle is a Bluetooth module. In still another embodiment, the at least one communication module of the motor vehicle is a mobile radio module. In yet another embodiment, the at least one communication module of the motor vehicle is an infrared module.

In one embodiment of the method, upon detection of damage to the parked motor vehicle, at least one communication module of the motor vehicle emits an interference signal in order that mobile communication devices situated in the environment of the motor vehicle are switched into a reception mode and put into a search mode, as a result of which the mobile communication devices situated in the environment of the motor vehicle become visible to the at least one communication module of the motor vehicle and are activated by the at least one communication module of the motor vehicle.

If the at least one communication module of the motor vehicle is a WLAN module, then by the active interference signal WLAN-enabled mobile communication devices in the environment of the motor vehicle, which may possibly already be logged into networks other than the WLAN of the parked motor vehicle, are switched into the reception mode and, as a result of the subsequent search mode, become visible to the at least one WLAN module of the parked motor vehicle and can be activated by the at least one WLAN module of the parked motor vehicle. As a result, the at least one WLAN module of the parked motor vehicle acquires the MAC addresses of the WLAN-enabled mobile communication devices situated in the environment of the parked motor vehicle.

The MAC address (Media Access Control address) is the hardware address of the network adapter of a mobile communication device that serves as a unique identifier of the device in a computer network. The term physical address or device address is also employed. In one embodiment of the method, the MAC address is matched to the IP address of the mobile communication device in order to determine the perpetrator of the damage. In a further embodiment of the method, the parked motor vehicle communicates a message to a mobile communication device of the perpetrator of the damage, e.g. via SMS or WAP Push. By way of example, a message might read: "Damage has been detected. Please log on to the vehicle WLAN in order to provide your contact data" or "Damage has been detected. Please contact the owner via the vehicle WLAN".

In a further embodiment, WLAN-enabled mobile communication devices situated in the environment of the parked motor vehicle are automatically logged into the WLAN of the motor vehicle.

In a further embodiment of the method, the perpetrator of the damage and persons situated in the environment of the motor vehicle are enabled to independently log into the WLAN server of the vehicle and thus to actively set up communication in order to leave messages (name, address, accident information, insurance data, etc.). This possibility avoids "messages on pieces of paper", which are not in conformity with legal requirements, and makes it unnecessary to report the accident to the police. Regulation of the damage between perpetrator and vehicle owner can be simplified.

In a further embodiment of the method, a message intended for the perpetrator of the damage is displayed by the parked motor vehicle. In one embodiment, the message is projected by a head-up display (HUD) of the motor vehicle onto a window of the motor vehicle. By way of example, a message might read: "Damage has been detected. Please log on to the vehicle WLAN in order to provide your contact data" or "Damage has been detected. Please contact the owner via the vehicle WLAN".

In a further embodiment of the method, a direct communication between the vehicle owner and the perpetrator of the damage is established via the WLAN of the parked motor vehicle.

Also described is a motor vehicle with a system configured for carrying out the method.

The system detects accidental damage. In one embodiment, the method includes detecting and evaluating vibrations of the motor vehicle and structure-borne sound events on bodywork parts of the motor vehicle. In a further embodiment, detection of accidental damage is accomplished by at least one acceleration sensor. The evaluating may classify vibrations and structure-borne sound events as a damage event (scratch/impact/dent/compression) depending on severity. Such systems for detecting accidental damage are known in principle to persons skilled in the art.

The system furthermore has a central module configured to be activated upon detection of accidental damage. The central module is connected to at least one communication module of the motor vehicle, which can be a WLAN module, for example. In one embodiment, the central module is connected to a plurality of communication modules arranged on the bodywork of the motor vehicle. In one embodiment, four communication modules are arranged on the bodywork of the motor vehicle in such a way that they are at the largest possible distance from one another, e.g. under the headlights and the rear lights of the motor vehicle. This ensures that the entire region of the surroundings of the motor vehicle) (360°) is covered. The communication modules enable car-to-X communication toward the outside in the parked mode.

The central module is configured to cause the at least one communication module of the motor vehicle to emit an interference signal which switches mobile communication devices situated in the environment of the motor vehicle into a reception mode and puts them into a search mode, and is configured to cause the mobile communication devices situated in the environment of the motor vehicle to be activated by the at least one communication module of the motor vehicle and to cause their MAC addresses to be determined. In one embodiment, the central module is configured to determine the associated IP address from the determined MAC address of a mobile communication device situated in the environment of the motor vehicle. Ascertaining the MAC address and matching it to the IP address make it possible subsequently to establish contact with the perpetrator of the damage, for example by way of push messages. Alternatively, the IP address makes it possible, in the case of failure to report an accident, for the perpetrator of the damage to be able to be determined directly.

Furthermore, the central module is configured as a wireless access point and is configured to establish a wireless connection to a mobile communication device of the vehicle owner and to communicate information to the mobile communication device of the vehicle owner. In a further embodiment, the central module is configured to establish a wireless connection to a mobile communication device of the perpetrator of accidental damage and to communicate information to the mobile communication device of the perpetrator of accidental damage. In a further embodiment, the central module is configured to establish a wireless connection to the Internet. In a further embodiment, the central module is configured to establish a bidirectional wireless connection between a mobile communication device of the vehicle owner and a mobile communication device of the perpetrator of accidental damage.

The advantages of the method and system include the provision of a possibility for direct communication between the perpetrator of damage to a parked motor vehicle and the vehicle owner. The perpetrator of the damage can communicate information and messages to the vehicle owner. The regulation of the damage between perpetrator and vehicle owner can be simplified as a result. "Messages on pieces of paper", which are not in conformity with legal requirements, are avoided and reporting the accident to the police becomes unnecessary.

Further advantages are evident from the description of the embodiments and the accompanying drawing.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

These and other aspects and advantages will become more apparent and more readily appreciated from the following description of the exemplary embodiments illustrated in the drawing in which:

the drawing illustrates an embodiment of a motor vehicle.

DETAILED DESCRIPTION

Reference will now be made in detail to the preferred embodiments, examples of which are illustrated in the accompanying drawings, wherein like reference numerals refer to like elements throughout.

The drawing illustrates a motor vehicle 10 having a central module 30 connected bidirectionally to four WLAN modules 31 arranged at the corners of the bodywork of the motor vehicle 10. Damage 20 has been caused on one side of the motor vehicle.

The drawing also schematically illustrates the owner 12 of the motor vehicle 10 and a mobile communication device 11 (e.g. a smartphone or a tablet computer) of the vehicle owner 12. Furthermore, the perpetrator 22 of the damage 20 and a WLAN-enabled mobile communication device 21 (e.g. a smartphone or a tablet computer) of the perpetrator 22 are depicted.

For illustrating the method, reference numerals 100, 110, 120, 130 and 140 are also in the drawing.

In 100, the damage 20 is detected by evaluation of the vibration—detected by sensors not illustrated—of the motor vehicle 10 or of the structure-borne sound signals caused by the damage event and the central module 30 and the WLAN modules 31 connected thereto are activated. The central module 30 boots an open WLAN.

In 110, an interference signal is emitted by way of the WLAN modules 31 and briefly interferes with the WLAN-enabled mobile communication device 21 of the perpetrator 22 that is situated in the environment of the motor vehicle 10, in order that device 21 goes to reception mode and is identified by the WLAN modules 31. As a result, the MAC address of the WLAN-enabled mobile communication device 21 of the perpetrator 22 is determined and is available for further evaluation. In 120, the MAC address determined is communicated to the mobile communication device 11 of the vehicle owner 12. The communication 120 can be effected via mobile radio or via the Internet, for example.

In 130, an interaction between the central module 30 and the perpetrator 22 is effected via the WLAN modules 31 and the mobile communication device 21. The interaction can, for example, be by communication of a message to the perpetrator 22, or in the perpetrator 22 logging into the WLAN of the motor vehicle 10 in order to leave a message or information. The interaction can for example also additionally include the projection of a message to the perpetrator 22 onto a window of the motor vehicle 10 via an HUD (not illustrated).

In one variant of the method, in 140, the central module 30 establishes a direct bidirectional communication connection between the mobile communication device 11 of the vehicle owner 12 and the mobile communication device 21 of the perpetrator 22, such that they can directly exchange information with one another.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

LIST OF REFERENCE SIGNS

10 Parked vehicle
11 Mobile communication device of the vehicle owner
12 Vehicle owner
20 Damage
21 Mobile communication device of the perpetrator of the damage
22 Perpetrator of the damage
30 Central module
31 WLAN module
100 Damage detection
110 Determining MAC address
120 Communicating MAC address
130 Communicating message
140 Bidirectional communication

The invention claimed is:

1. A method, comprising:
   detecting damage to a parked motor vehicle;
   automatically logging WLAN-enabled mobile communication devices within range of the parked motor vehicle into a WLAN of the parked motor vehicle;
   emitting, by at least one communication module of the parked motor vehicle, an interference signal causing at least one mobile communication device within communication range of the parked motor vehicle to be switched into a reception mode and put into a search mode, thereby making the at least one mobile communication device detectable by the at least one communication module of the parked motor vehicle;
   acquiring, by the at least one communication module of the parked motor vehicle, at least one MAC address of the at least one mobile communication device; and
   sending at least one MAC address to a registered mobile communication device of an owner of the parked vehicle.

2. The method as claimed in claim 1, further comprising sending, by the parked motor vehicle an electronic message to one of the at least one mobile communication device determined to correspond to a perpetrator of damage to the parked motor vehicle.

3. The method as claimed in claim 2, wherein the electronic message is communicated by way of WAP Push.

4. The method as claimed in claim 1, further comprising enabling at least the perpetrator of the damage within range of the parked motor vehicle to independently log into a WLAN server of the vehicle to leave messages.

5. The method as claimed in claim 4, further comprising displaying a visible message intended for the perpetrator of the damage by the parked motor vehicle.

6. The method as claimed in claim 5, further comprising establishing a direct communication between the owner of the parked vehicle and the perpetrator of the damage via the WLAN of the parked motor vehicle.

7. The method as claimed in claim 1, further comprising enabling at least the perpetrator of the damage within range of the parked motor vehicle to independently log into a WLAN server of the vehicle to leave messages.

8. The method as claimed in claim 1, further comprising displaying a visible message intended for the perpetrator of the damage by the parked motor vehicle.

9. The method as claimed in claim 1, further comprising establishing a direct communication between the owner of the parked vehicle and the perpetrator of the damage via the WLAN of the parked motor vehicle.

10. A motor vehicle comprising:
   sensors configured to detect accidental damage;
   at least one communication module; and
   a wireless access point, connected to the sensors and the at least one communication module, configured to become activated upon detection of accidental damage by the sensors,
   automatically log WLAN-enabled mobile communication devices within range of the parked motor vehicle into a WLAN of the parked motor vehicle, cause the at least one communication module of the motor vehicle to emit an interference signal which switches mobile communication devices within range of the motor vehicle into a reception mode and into a search mode, determine MAC addresses of the mobile communication devices, establish a wireless connection to a registered mobile communication device of an owner of the vehicle, and communicate information to the registered mobile communication device of the owner.

11. The motor vehicle as claimed in claim 10, wherein the wireless access point is further configured to establish a wireless connection to one of the at least one mobile communication device determined to correspond to a perpetrator of damage to the motor vehicle and to communicate information to the one of the at least one mobile communication device of the perpetrator.

* * * * *